US012234980B2

(12) United States Patent
Liu

(10) Patent No.: US 12,234,980 B2
(45) Date of Patent: Feb. 25, 2025

(54) SAND PAINTING LAMP

(71) Applicant: Fei Liu, Zhoukou (CN)

(72) Inventor: Fei Liu, Zhoukou (CN)

( * ) Notice: Subject to any disclaimer, the term of this patent is extended or adjusted under 35 U.S.C. 154(b) by 565 days.

(21) Appl. No.: 17/813,025

(22) Filed: Jul. 15, 2022

(65) Prior Publication Data

US 2024/0019103 A1 Jan. 18, 2024

(51) Int. Cl.
*F21V 3/02* (2006.01)
*F21S 2/00* (2016.01)

(52) U.S. Cl.
CPC ................ *F21V 3/02* (2013.01); *F21S 2/005* (2013.01)

(58) Field of Classification Search
CPC .................................. F21S 2/005; F21V 3/02
See application file for complete search history.

(56) References Cited

FOREIGN PATENT DOCUMENTS

CN 216357140 U * 4/2022
CN 216659425 U * 6/2022

* cited by examiner

*Primary Examiner* — Anabel Ton
(74) *Attorney, Agent, or Firm* — Daniel M. Cohn; Howard M. Cohn

(57) ABSTRACT

A sand painting lamp includes a sand painting body, and a light-emitting lamp. The sand painting body includes a side portion. The side portion includes a light-transmitting portion. The light-emitting lamp is disposed opposite to the side portion. A light-emitting surface of the light-emitting lamp faces the light-transmitting portion. Light emitted from the light-emitting lamp illuminates the sand painting body from the side portion of the sand painting body, so that the sand painting body is fully illuminated. The combination of the light-emitting lamp and the sand painting body displays a good sand painting effect, and decorative effect is excellent, which satisfies the needs of the users.

10 Claims, 5 Drawing Sheets

SAND PAINTING LAMP

TECHNICAL FIELD

The present disclosure relates to a technical field of sand paintings, and in particular to a sand painting lamp.

BACKGROUND

Sand painting, that is, painting with sand. It is a unique art, which combines aesthetics of modern people, relies on profound cultural heritage and cultural connotation, and is made of colored sand. In order to integrate sand painting art into life, sand painting lamps are invented. However, effect of combination of a lamp and a sand painting in the sand painting lamp of the prior art cannot meet needs of users.

SUMMARY

The present disclosure provides a sand painting lamp, and a light-emitting lamp combines a sand painting body to display a good sand painting effect in cooperation with needs of users.

The present disclosure provides a sand painting lamp. The sand painting lamp comprises a sand painting body, and a light-emitting lamp. The sand painting body comprises a side portion. The side portion comprises a light-transmitting portion. The light-emitting lamp is disposed opposite to the side portion. A light-emitting surface of the light-emitting lamp faces the light-transmitting portion.

In some optional embodiments, the sand painting body comprises a first base body, a second base body, and a connecting portion. The first base body is disposed opposite to the second base body. The first base body and the second base body are disposed at interval. The connecting portion connects the first base body and the second base body. The connecting portion encloses the first base body and the second base body to form an accommodating cavity. The accommodating cavity is configured to accommodate sand. The connecting portion forms the side portion.

In some optional embodiments, the connecting portion surrounds an edge of the first base body. The connecting portion surrounds an edge of the second base body. The connecting portion is a light-transmitting structure.

In some optional embodiments, the sand painting lamp further comprises a sand painting holder. The sand painting holder is disposed around the side portion of the sand painting body. The sand painting body is installed on the sand painting holder. The light-emitting lamp is installed on an inner side of the sand painting holder facing the sand painting body.

In some optional embodiments, the sand painting lamp further comprises a support. The sand painting holder is rotatably installed on the support. The sand painting holder drives the sand painting body to rotate with respect to the support.

In some optional embodiments, the sand painting lamp further comprises a base, a circuit board, and a connecting wire. The support is disposed on the base. The base defines an installation space. The circuit board is installed in the installation space. A first end of the connecting wire is electrically connected to the light-emitting lamp. A second end of the connecting wire is electrically connected to the circuit board.

In some optional embodiments, the support comprises a first rotating shaft. The sand painting holder comprises a second rotating shaft. The second rotating shaft is rotatably disposed on the first rotating shaft.

In some optional embodiments, the support further comprises a third rotating shaft disposed opposite to the first rotating shaft. The sand painting holder further comprises a fourth rotating shaft disposed opposite to the second rotating shaft. The third rotating shaft is rotatably disposed on the fourth rotating shaft.

In some optional embodiments, an interior of the first rotating shaft and an interior of the second rotating shaft define a first channel. The connecting wire passes through the first channel to electrically connect the light-emitting lamp.

In some optional embodiments, an interior of the support defines a second channel. The second channel is communicated with the installation space of the base. The connecting wire passes through the second channel and the installation space to electrically connect the light-emitting lamp with the circuit board.

In the embodiments of the present disclosure, the sand painting lamp comprises the sand painting body and the light-emitting lamp. The sand painting body comprises the sand to display different sand paintings. The side portion of the sand painting body comprises a light-transmitting portion. The light-emitting lamp is disposed opposite to the side portion. The light-emitting surface of the light-emitting lamp is disposed with respect to the light-transmitting portion. The light emitted from the light-emitting lamp illuminates the sand painting body from the side portion of the sand painting body, so that the sand painting body is fully illuminated. The combination of the light-emitting lamp and the sand painting body displays a good sand painting effect, and decorative effect is excellent, which satisfies the needs of the users.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For better understanding the present disclosure, the following description will be made with reference to the accompanying drawings, wherein same reference numerals refer to same parts in the following description.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
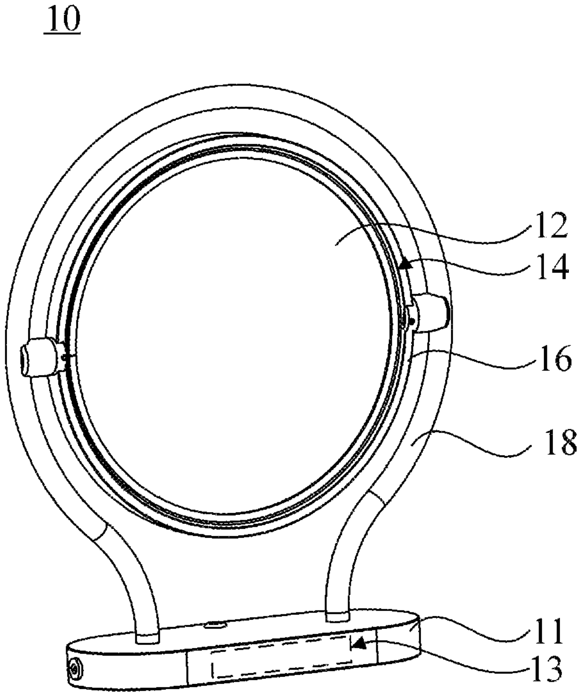
FIG. 1 is a schematic diagram of a sand painting lamp according to one embodiment of the present disclosure.
Figure 2:
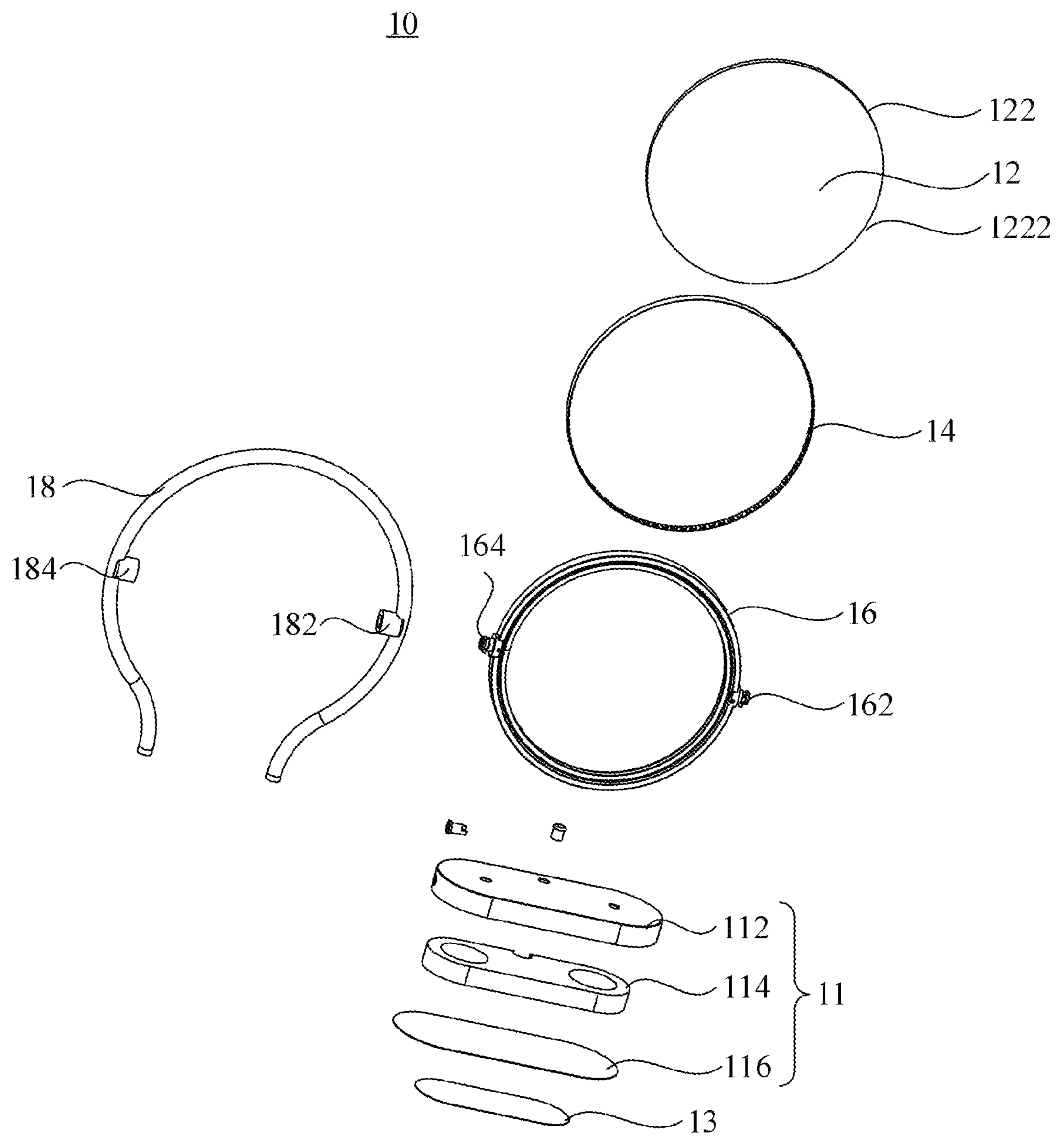
FIG. 2 is an exploded schematic diagram of the sand painting lamp shown in FIG. 1.

The present disclosure provides a sand painting lamp. As shown in FIGS. 1 and 2, FIG. 1 is a schematic diagram of a sand painting lamp according to one embodiment of the present disclosure and FIG. 2 is an exploded schematic diagram of the sand painting lamp shown in FIG. 1. The sand painting body comprises sand to provide different sand painting effect. The sand painting lamp comprises a sand painting body 12, and a light-emitting lamp 14. The sand painting body 12 comprises a side portion 122. The side portion 122 comprises a light-transmitting portion 1222. The light-emitting lamp 14 is disposed opposite to the side portion 122. A light-emitting surface of the light-emitting lamp 14 faces the light-transmitting portion 1222. The light emitted from the light-emitting lamp emits to the sand painting body from the side portion of the sand painting body 12, so that the sand painting body 12 is fully illuminated. The combination of the light-emitting lamp 14 and the sand painting body 12 displays a good sand painting effect, and decorative effect is excellent, which satisfies the needs of the users.

Figure 3:
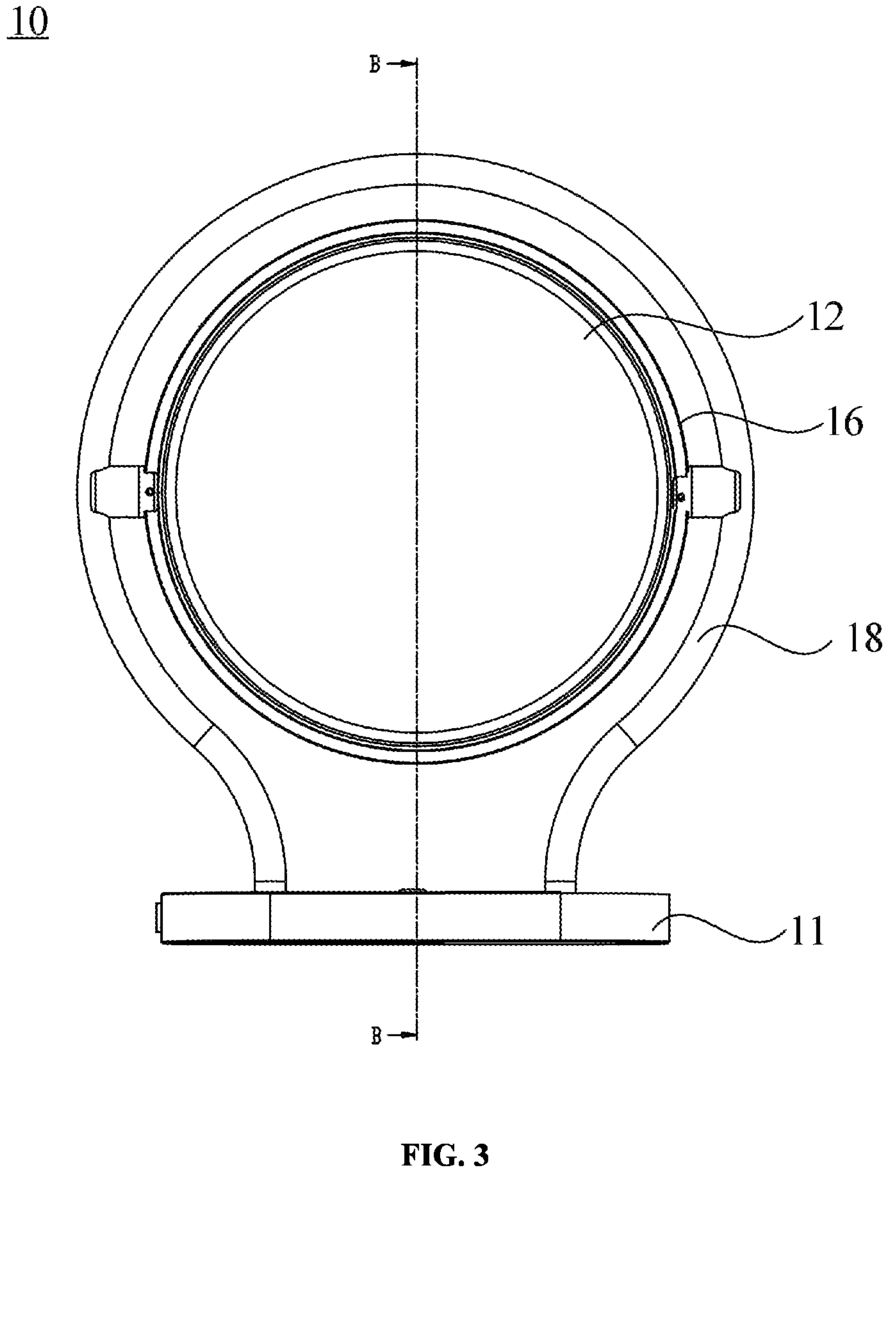
FIG. 3 is another schematic diagram of the sand painting lamp shown in FIG. 1.
Figure 4:
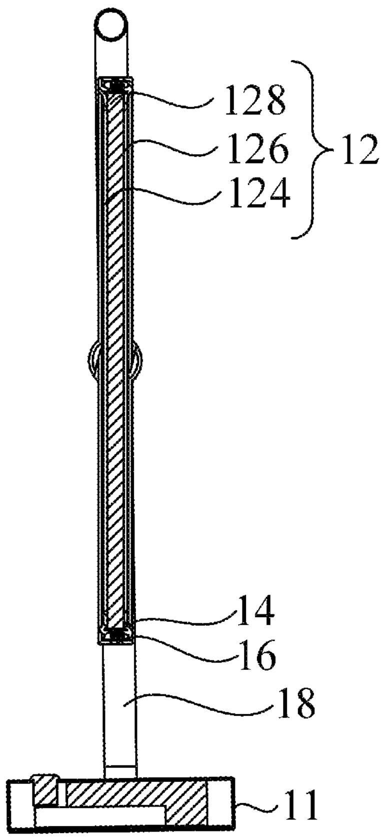
FIG. 4 is a cross-sectional schematic diagram of the sand painting lamp taken along the line B-B shown in FIG. 3.

As shown in FIGS. 3 and 4, FIG. 3 is another schematic diagram of the sand painting lamp shown in FIG. 1 and FIG. 4 is a cross-sectional schematic diagram of the sand painting lamp taken along the line B-B shown in FIG. 3. The sand painting body 12 comprises a first base body 124, a second base body 126, and a connecting portion 128. The first base body 124 is disposed opposite to the second base body 126. The first base body 124 and the second base body 126 are disposed at interval. The connecting portion 128 connects the first base body 124 and the second base body 128. The connecting portion 128 encloses the first base body 124 and the second base body 128 to form an accommodating cavity. The accommodating cavity is configured to accommodate sand. The connecting portion 128 forms the side portion 122.

In some optional embodiments, the connecting portion 128 surrounds an edge of the first base body 124. The connecting portion 128 surrounds an edge of the second base body 126. The connecting portion 128 is a light-transmitting structure. The connection portion 128 is light-transmitting. Therefore, the light emitted by the light-emitting lamp 14 is not blocked by the connecting portion 128, and can directly enter the sand painting body 12 from the side portion 122 formed by the connecting portion 128.

Materials of the first base body 124 and the second base body 126 are set as required. For example, the materials of the first base body 124 and the second base body 126 are light-transmitting materials, such as transparent materials such as glass and resin. In another embodiment, the first base body 124 and the second base body 126 may be partially made of light-transmitting material and partially made of opaque material.

Material of the connecting portion 128 is set as required. For example, the connecting portion 128 is made of light-transmitting glue, and the first base body 124 and the second base body 126 are bonded and fixed by the light-transmitting glue.

For convenience of understanding, the following description is given by taking the first base body 124 and the second base body 126 as glass as an example.

The first base body 124 and the second base body 126 may be symmetrically disposed, that is, a shape of the first base body 124 is same as a shape of the second base body 126. The first base body 124 and the second base body 124 are disposed at an interval. The first base body 124 and the second base body 126 are bonded with the light-transmitting glue. The accommodating cavity formed by the first base body 124, the second base body 126, and the light-transmitting glue is configured to accommodate colored sand. The colored sand forms a sand painting in the accommodating cavity. It should be noted that the sand painting may be an unfixed pattern or a fixed pattern. For example, when the sand painting body 12 is rotated, the colored sand in the accommodating cavity rotates along with the sand painting body to form a new pattern.

The shapes of the first base body 124 and the second base body 126 can be set as required. For example, the shapes of the first base body 124 and the second base body 126 may be regular shapes such as circles, ovals, rectangles, squares, regular polygons, and diamonds, or the shapes of the first base body 124 and the second base body 126 may be irregular shapes, which are not limited thereto.

In some optional embodiments, the first base body 124 and the second base body 126 are disposed asymmetrically. For example, a size of the first base body is greater than a size of the second base body, and the connecting portion is configured to fix the second base body on the first base body. The connecting portion may surround an outer periphery of the second base body and be disposed on one side of the first base body facing the second base body. Of course, the connecting portion may be bonded and fixed with the first base body and the second base body respectively. The connecting portion may be a rubber ring, a plastic ring, or a glass ring, etc. formed of transparent materials.

In some embodiment, the light-emitting lamp 14 is provided as required. For example, the light-emitting lamp 14 is an LED lamp and the light-emitting lamp 14 comprises lamp beads of various colors. In one embodiment, the light-emitting lamp 14 comprise at least lamp beads with at least two different colors. The lamp beads are selected from white lamp beads, red lamp beads, blue lamp beads, green lamp beads, purple lamp beads, yellow lamp beads, etc. The light-emitting lamp 14 may comprise multiple groups of lamp beads, and each group of lamp beads comprises lamp beads with three different colors (i.e. red lamp beads, blue lamp beads, and green lamp beads). And group of lamp beads are combined according to actual needs, so as to emit colorful lights, such as red light, green light, blue light, orange light, yellow light, purple light, white light and light with other colors. Of course, in some other embodiments, the light-emitting lamp 14 may only comprise lamp beads of one color, such as white lamp beads or yellow lamp beads.

Optionally, the light-emitting lamp 14 is a light strip. The light strip is disposed around the side portion 122 of the sand painting body 12. The light strip is enclosed to from a ring to sleeve on the side portion of the sand painting body. A plurality of lamp beads are disposed on the light strip. By such arrangement, the light is emitted from the side portion of the sand painting body 12 and the colored sand in the sand painting body 12 is fully illuminated, and the decoration effect is excellent. Of course, in some other embodiments, the light-emitting lamp 14 may be a plurality of independent lamps, and the plurality of independent lamps are disposed at intervals and disposed around the outer periphery of the side portion 122 of the sand painting body 12.

As shown in FIGS. 1-4, the sand painting lamp further comprises a sand painting holder 16. The sand painting holder 16 is disposed around the side portion 122 of the sand painting body 12. The sand painting body 12 is installed on the sand painting holder 16. The light-emitting lamp 14 is installed on an inner side of the sand painting holder 16 facing the sand painting body 12.

It is understood that if the light-emitting lamp 14 and the side portion 122 of the sand painting body 12 are exposed to an outside, the sand painting lamp is easily damaged. Especially, when the first base body 124 and the second base body 126 of the sand painting body are made of glass, they are relatively fragile, especially the side portion 122 of the sand painting body 12. Therefore, the sand painting holder 16 is disposed around the side portion 122 of the sand painting body 12 so as to protect the side portion 122 of the sand painting body 12. In one embodiment, the sand painting holder 16 is annular, and the sand painting carrier 16 is disposed around the side portion 122 of the sand painting body 12. The sand painting holder 16 is configured to hold both of the light-emitting lamp 14 and the sand painting body 12. That is, the light-emitting lamp 14 is correspondingly disposed on the inner side of the sand painting carrier 16 facing the sand painting body 12, so that the light-emitting lamp 14 emits light to the sand painting body 12 from the side portion 122 of the sand painting body 12.

The sand painting holder 16 is an integrally formed annular structure, or comprises strips, and then free ends of the strips are connected to form the annular structure.

In some embodiments, the light-emitting lamp 14 is installed on the side portion of the sand painting body. For example, the light-emitting lamp is attached to the side portion of the sand painting body.

In some embodiments, the sand painting lamp further comprises a support 18. The sand painting holder 16 is rotatably installed on the support 18. The sand painting holder 16 drives the sand painting body 12 to rotate with respect to the support 18.

Figure 5:
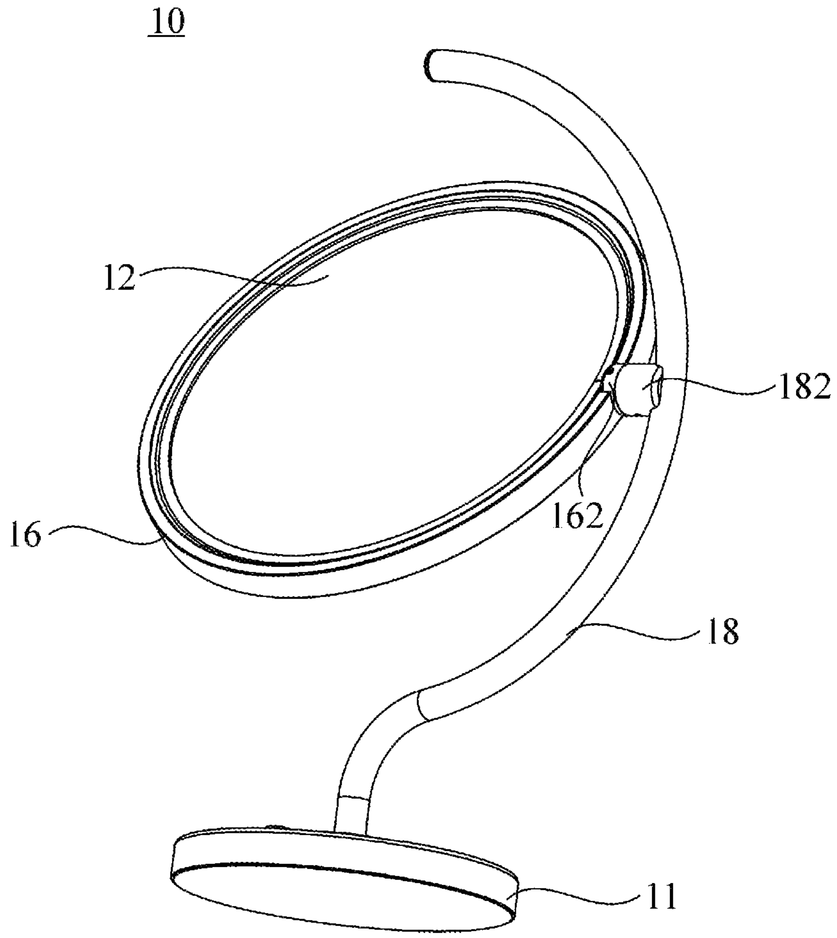
FIG. 5 is a schematic diagram of the sand painting lamp according to another embodiment of the present disclosure.

In one embodiment, as shown in FIG. 5, and FIG. 5 is a schematic diagram of the sand painting lamp according to another embodiment of the present disclosure. The support 18 comprises a first rotating shaft 182. The sand painting holder 16 comprises a second rotating shaft 162. The second rotating shaft 162 is rotatably disposed on the first rotating shaft 182, so that the sand painting holder 16 is rotatable with respect to the support 18 through the first rotating shaft 182 and the second rotating shaft 162 and the sand painting holder 16 is able to rotate 360 degrees around axes of the first rotating shaft 182 and the second rotating shaft 162. Because the light-emitting lamp 14 is disposed on the sand painting holder 16 or the sand painting body 12, the light-emitting lamp 14 is able to rotate together with the sand painting body 12. No matter how the sand painting body 12 rotates, a position of the light-emitting lamp 14 with respect to the sand painting body 12 is fixed and the light emitted by the light-emitting lamp 14 illuminate the sand painting body 12, which improves the stability of the combination of the sand painting body 12 and the light-emitting lamp 14. It should be noted that the second rotating shaft 162 may be disposed on bottom, top or middle of the sand painting holder 16.

The sand painting holder 16 is connected to the support through rotating shafts disposed on one side or rotating shafts disposed on two sides of the sanding painting holder 16. In another embodiment, as shown in FIGS. 1-4, except for the first rotating shaft 182, the support 18 further comprises a third rotating shaft 184 disposed opposite to the first rotating shaft 182. The sand painting holder 16 further comprises a fourth rotating shaft 164 disposed opposite to the second rotating shaft 162. The third rotating shaft 184 is rotatably disposed on the fourth rotating shaft 164. The sand painting holder 16 is rotatably connected to the support 18 through two sets of rotating shafts, so that the rotation is stable. The rotating shafts have lower technological requirements and therefore have lower costs.

The second rotating shaft 162 and the fourth rotating shaft 164 can be disposed in a horizontal direction of the sand painting lamp. That is, the second rotating shaft 162 and the fourth rotating shaft 164 are oppositely disposed with respect to the middle of the sand painting body 12, so that the sand painting holder 16 and the sand painting body 12 are able to rotate 360 degrees around the axes of the rotating shafts parallel to the horizontal direction of the sand painting lamp. The second rotating shaft 162 and the fourth rotating shaft 164 may be disposed in a vertical direction. That is, the second rotating shaft 162 and the fourth rotating shaft 164 are separately oppositely disposed on the top and bottom of the sand painting body 12, so that the sand painting holder 16 and the sand painting body 12 are able to rotate 360 degrees around a vertical axis parallel to the vertical direction. The first rotating shaft 182 and the second rotating shaft 162 may be disposed in a direction inclined to a horizontal plane. That is, the second rotating shaft 162 is disposed between the middle and the top of the sand painting body 12, and the fourth rotating shaft 164 is disposed between the middle and the bottom of the sand painting body 12. so that the sand painting holder 16 and the sand painting body 12 are rotatable 360 degrees around an axis inclined to the horizontal direction.

The sand painting lamp further comprises a base 11, a circuit board 13, and a connecting wire. The support 18 is disposed on the base 11. The base 11 defines an installation space. The circuit board 13 is installed in the installation space. A first end of the connecting wire is electrically connected to the light-emitting lamp 14. A second end of the connecting wire is electrically connected to the circuit board 13.

The circuit board 13 is configured to control a light-emitting mode of the light-emitting lamp 14. For example, the circuit board 13 controls a light-emitting color, light-emitting brightness, flickering frequency, color switching sequence, etc. of the light-emitting lamp 14.

It should be noted that the sand painting lamp 10 further comprises a control switch disposed on the base 11. The control switch is electrically connected to the circuit board 13, and the control switch is configured to control the light-emitting mode of the light-emitting lamp 14 through the circuit board 13. The control switch may comprise one or more buttons, or the control switch may comprise one or more knobs, or the control switch may comprise one or more buttons and one or more knobs at the same time.

The circuit board 13 further comprises a wireless communication module, through which circuit board 13 receives a control command from an external device such as a mobile phone, and responds to the control command to control the light-emitting lamp to enter a different light-emitting mode. For example, the circuit board 13 switches the light-emitting lamp 14 to a different light-emitting mode, switches the light-emitting lamp 14 to a different level of brightness, controls the light-emitting lamp 14 to emit light of different colors, adjusts the flashing frequency of light-emitting lamp, etc. The wireless communication module is selected from a WIFI communication module, a BLUETOOTH communication module, and other wireless communication modules.

It can be understood that the sand painting lamp 10 is able to be controlled by the control switch alone, or be controlled by the wireless communication module alone, or be controlled by both of the control switch and the wireless communication module.

The circuit board 13 further comprises a power supply circuit. The power supply circuit is connected to an external power supply. The external power supply provides power to the circuit board 13 and the light-emitting lamp 14. The power supply circuit can be set as required, and the power that the power circuit receives is direct current or alternating current.

The sand painting lamp 10 further comprises a battery. The battery is disposed in the base 11. The battery is configured to supply power to the circuit board 13 and the light-emitting lamp 14. The battery is a rechargeable battery or a non-rechargeable battery. When the battery is a rechargeable battery, the power supply circuit charges the battery. Of course, in some embodiments, the sand painting lamp 10 do not have a battery, and the sand painting lamp 10 is powered by the power supply circuit.

In some optional embodiments, an interior of the first rotating shaft 182 and an interior of the second rotating shaft 162 define a first channel. The connecting wire passes through the first channel to electrically connect the light-emitting lamp 14. The connecting wire is not exposed to the outside through the first channel, which not only protects the connecting wire, but also makes the sand painting lamp 10 beautiful in appearance.

It should be noted that the connecting wire passes through the interior of first rotating shaft 182 and the interior of the second rotating shaft 162. In addition, the connecting wire has a certain margin, so that when the first rotating shaft 182 rotates with respect to the second rotating shaft 162, the connecting wire is electrically connected to the light-emitting lamp 14. In some other embodiments, the sand painting lamp 10 further comprises a metal dome and a metal piece. The connecting wire is connected to one of the metal dome and the metal piece, and the light-emitting lamp 14 is connected to the other of the metal dome and the metal piece. When the first rotating shaft rotates with respect to the second rotating shaft 162, the metal dome with respect to the metal piece rotate, and at the same time, elastic force of the metal dome maintains a stable connection between the metal dome and the metal piece.

In some optional embodiments, an interior of the support 18 defines a second channel. The second channel is communicated with the installation space of the base 11. The connecting wire passes through the second channel and the installation space to electrically connect the light-emitting lamp 14 with the circuit board 13. The connecting wire is not only disposed in the first rotating shaft 182 and the second rotating shaft 162 but also disposed in the support 18, and enters the installation space of the base 11 along the second channel in the support 18. Thus, the connecting wire is completely hidden in the support 18 and the base 11, which not only protect the connecting wire from damage, but also improve the appearance of the sand painting lamp 10.

It can be understood that, in some other embodiments, the connecting wire is disposed at other positions as required, such as being attached to an outer side of the support 18.

The sand painting lamp 10 provided by the embodiments of the present disclosure has been described in detail above. Principles and implementations of the present disclosure are described with specific embodiments in this paper. The descriptions of the above embodiments are only for better understanding of the method and core idea of the present disclosure. Those skilled in the art can make changes to the specific embodiments and application scope according to the idea of the disclosure. In summary, the content of this specification should not be construed as a limitation to the present disclosure.

What is claimed is:

1. A sand painting lamp, comprising:
a sand painting body; and
a light-emitting lamp;
wherein the sand painting body comprises a side portion; the side portion comprises a light-transmitting portion; the light-emitting lamp is disposed opposite to the side portion; a light-emitting surface of the light-emitting lamp faces the light-transmitting portion;
wherein the sand painting lamp further comprises a sand painting holder; the sand painting holder is disposed around the side portion of the sand painting body; the sand painting lamp further comprises a support; the support comprises a first rotating shaft; the sand painting holder comprises a second rotating shaft; the second rotating shaft is rotatably disposed on the first rotating shaft;
wherein an interior of the first rotating shaft and an interior of the second rotating shaft define a first channel: the connecting wire passes through the first channel to electrically connect the light-emitting lamp.

2. The sand painting lamp according to claim 1, wherein the sand painting body comprises a first base body, a second base body, and a connecting portion; the first base body is disposed opposite to the second base body; the first base body and the second base body are disposed at intervals; the connecting portion connects the first base body and the second base body; the connecting portion encloses the first base body and the second base body to form an accommodating cavity; the accommodating cavity is configured to accommodate sand; the connecting portion forms the side portion.

3. The sand painting lamp according to claim 2, wherein the connecting portion surrounds an edge of the first base body; the connecting portion surrounds an edge of the second base body; the connecting portion is a light-transmitting structure.

4. The sand painting lamp according to claim 1, wherein the sand painting body is installed on the sand painting holder; and the light-emitting lamp is installed on an inner side of the sand painting holder facing the sand painting body.

5. The sand painting lamp according to claim 4, wherein the sand painting holder is rotatably installed on the support; the sand painting holder drives the sand painting body to rotate with respect to the support.

6. The sand painting lamp according to claim 5, wherein the sand painting lamp further comprises a base, a circuit board, and a connecting wire; the support is disposed on the base; the base defines an installation space; the circuit board is installed in the installation space; a first end of the connecting wire is electrically connected to the light-emitting lamp; a second end of the connecting wire is electrically connected to the circuit board.

7. The sand painting lamp according to claim 6, wherein an interior of the first rotating shaft and an interior of the second rotating shaft define a first channel; the connecting wire passes through the first channel to electrically connect the light-emitting lamp.

8. The sand painting lamp according to claim 6, wherein an interior of the support defines a second channel; the second channel is communicated with the installation space of the base; the connecting wire passes through the second channel and the installation space to electrically connect the light-emitting lamp with the circuit board.

9. A sand painting lamp, comprising:
a sand painting body; and a light-emitting lamp;

wherein the sand painting body comprises a side portion; the side portion comprises a light-transmitting portion; the light-emitting lamp is disposed opposite to the side portion; a light-emitting surface of the light-emitting lamp faces the light-transmitting portion;

wherein the sand painting lamp further comprises a sand painting holder, a support, a circuit board, and a connecting wire; the sand painting holder is disposed around the side portion of the sand painting body; a first end of the connecting wire is electrically connected to the light-emitting lamp; a second end of the connecting wire is electrically connected to the circuit board; the support comprises a first rotating shaft; the sand painting holder comprises a second rotating shaft; the second rotating shaft is rotatably disposed on the first rotating shaft;

an interior of the first rotating shaft and an interior of the second rotating shaft define a first channel; the connecting wire passes through the first channel to electrically connect the light-emitting lamp.

10. A sand painting lamp, comprising:

a sand painting body; and a light-emitting lamp;

wherein the sand painting body comprises a side portion; the side portion comprises a light-transmitting portion; the light-emitting lamp is disposed opposite to the side portion; a light-emitting surface of the light-emitting lamp faces the light-transmitting portion;

wherein the sand painting lamp further comprises a sand painting holder, a support, a base, a circuit board, and a connecting wire; the sand painting holder is disposed around the side portion of the sand painting body; the support is disposed on the base; the base defines an installation space; the circuit board is installed in the installation space; a first end of the connecting wire is electrically connected to the light-emitting lamp; a second end of the connecting wire is electrically connected to the circuit board; the support comprises a first rotating shaft; the sand painting holder comprises a second rotating shaft; the second rotating shaft is rotatably disposed on the first rotating shaft;

wherein an interior of the first rotating shaft and an interior of the second rotating shaft define a first channel; the connecting wire passes through the first channel to electrically connect the light-emitting lamp;

wherein an interior of the support defines a second channel; the second channel is communicated with the installation space of the base; the connecting wire passes through the second channel and the installation space to electrically connect the light-emitting lamp with the circuit board.

* * * * *